United States Patent
Tsirkin

(10) Patent No.: US 11,537,420 B2
(45) Date of Patent: Dec. 27, 2022

(54) POWER MANAGEMENT FOR VIRTUALIZED COMPUTER SYSTEMS

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 446 days.

(21) Appl. No.: 16/395,054

(22) Filed: Apr. 25, 2019

(65) Prior Publication Data
US 2020/0341791 A1    Oct. 29, 2020

(51) Int. Cl.
G06F 9/455    (2018.01)
G06F 11/30    (2006.01)
G06F 11/34    (2006.01)
G06F 1/28    (2006.01)

(52) U.S. Cl.
CPC ............ *G06F 9/45558* (2013.01); *G06F 1/28* (2013.01); *G06F 11/301* (2013.01); *G06F 11/3024* (2013.01); *G06F 11/3062* (2013.01); *G06F 11/3065* (2013.01); *G06F 11/3419* (2013.01); *G06F 2009/45575* (2013.01); *G06F 2009/45591* (2013.01)

(58) Field of Classification Search
CPC ...... G06F 9/45558; G06F 1/28; G06F 11/301; G06F 11/3024; G06F 11/3062; G06F 11/3065; G06F 11/3419; G06F 2009/45575; G06F 2009/45591
See application file for complete search history.

(56) References Cited

U.S. PATENT DOCUMENTS

| | | | |
|---|---|---|---|
| 6,378,018 B1 | 4/2002 | Tsern et al. | |
| 3,341,628 A1 | 12/2012 | Arndt et al. | |
| 8,495,331 B2 | 7/2013 | Matsumoto et al. | |
| 9,152,200 B2 * | 10/2015 | Parthasarathy | G06F 1/329 |
| 9,501,137 B2 | 11/2016 | Kruglick | |
| 9,575,543 B2 | 2/2017 | Conrad et al. | |
| 9,753,531 B2 | 9/2017 | Jahagirdar et al. | |
| 10,162,658 B2 | 12/2018 | Nicholas et al. | |
| 2010/0192149 A1 * | 7/2010 | Lathrop | G06F 1/3203 718/1 |
| 2010/0218183 A1 * | 8/2010 | Wang | G06F 1/3228 718/1 |

(Continued)

OTHER PUBLICATIONS

UEFI "Advanced Configuration and Power Interface Specification", Version 6.2, May 2017, pp. 1-1192. (Year: 2017).*

(Continued)

*Primary Examiner* — Meng Ai T An
*Assistant Examiner* — Willy W Huaracha
(74) *Attorney, Agent, or Firm* — Lowenstein Sandler LLP

(57) ABSTRACT

Aspects of the disclosure provide for mechanisms for memory protection of virtual machines in a computer system. A method of the disclosure includes: determining a plurality of host latency times for a plurality of processor power states of a processor of a host computer system; comparing, by a hypervisor executed on the host computer system, each of the host latency times to a target latency time associated with a virtual machine running on the host computer system; mapping the plurality of processor power states to a plurality of host power states in view of the comparison; and providing the host power states to the virtual machine.

18 Claims, 10 Drawing Sheets

(56) References Cited

U.S. PATENT DOCUMENTS

| | | |
|---|---|---|
| 2011/0154323 A1* | 6/2011 | Arndt .................. G06F 9/45541 |
| | | 718/1 |
| 2011/0187438 A1 | 8/2011 | Yeung et al. |
| 2014/0181811 A1* | 6/2014 | Tsirkin ................ G06F 9/45558 |
| | | 718/1 |
| 2014/0245294 A1* | 8/2014 | Kaul .................. G06F 9/45558 |
| | | 718/1 |
| 2015/0193249 A1* | 7/2015 | van Riel ................... G06F 9/50 |
| | | 718/1 |
| 2015/0227192 A1* | 8/2015 | Kruglick ............. G06F 9/45558 |
| | | 713/323 |
| 2015/0242229 A1* | 8/2015 | van Riel ............. G06F 9/45545 |
| | | 718/1 |
| 2016/0224362 A1 | 8/2016 | Tsirkin et al. |
| 2018/0011733 A1 | 1/2018 | Tsirkin |
| 2018/0060103 A1* | 3/2018 | Tsirkin ................ G06F 9/45545 |
| 2018/0113764 A1 | 4/2018 | Bhandari et al. |
| 2018/0341510 A1 | 11/2018 | Tsirkin |

OTHER PUBLICATIONS

VMware, Inc., "vSphere Resource Management", VMware vSphere 6.7, VMware ESXi6.7, vCenter Server 6.7, Apr. 17, 2018, 150 pages.

Onaindia et al., A Hypervisor Architecture for Low-Power Real-Time Embedded Systems, 21st Euromicro Conference on Digitial System Design, DSD, 2018, 8 pages, Prague, Czech Republic.

* cited by examiner

POWER MANAGEMENT FOR VIRTUALIZED COMPUTER SYSTEMS

TECHNICAL FIELD

The implementations of the disclosure generally relate to computer systems and, more specifically, to power management for virtual machines for virtualized computer systems.

BACKGROUND

Virtualization allows multiplexing of an underlying host machine between different virtual machines. The host machine allocates a certain amount of its resources to each of the virtual machines. Each virtual machine is then able to use the allocated resources to execute applications, including operating systems (referred to as guest operating systems). An executable layer that provides the virtualization is commonly referred to as a hypervisor (also known as a virtual machine monitor (VMM)). The hypervisor emulates the underlying hardware of the host computer, making the use of the virtual machine transparent to the guest operating system and the user of the computer. A host machine can accommodate more virtual machines than the size of its physical memory allows. Using virtual memory techniques, the host machine can give each virtual machine the impression that it has a contiguous address space, while in fact the memory used by the virtual machine may be physically fragmented and even overflow to disk storage.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
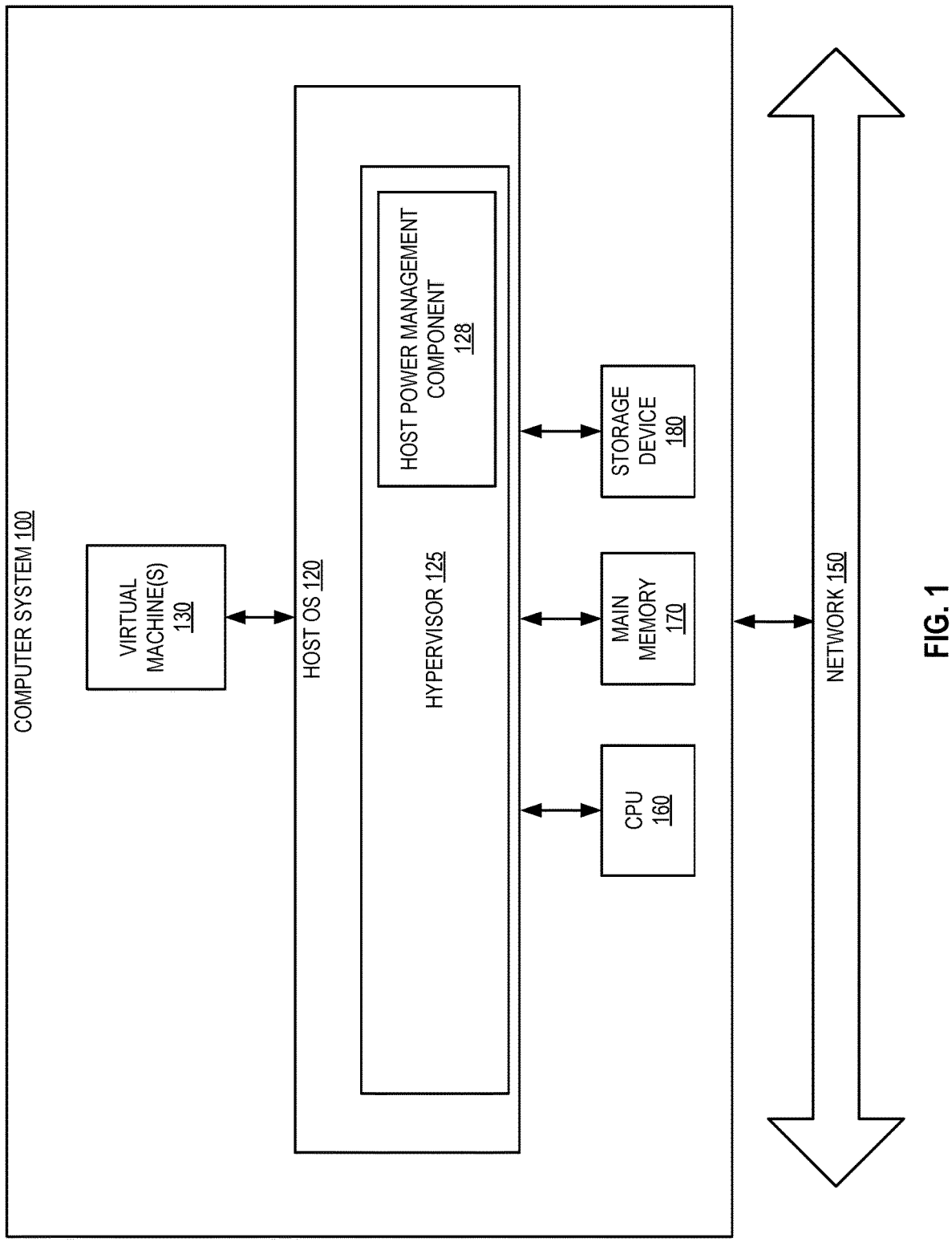
FIG. 1 is an example computer system architecture, in accordance with an embodiment of the present disclosure.

Power management for a virtualized computer system may involve monitoring status of hardware components of a host computer system by a hypervisor and configuring the hardware component accordingly (e.g., by putting unused components to sleep). For example, the hypervisor may place a central processing unit (CPU) of the host computer system in a processor idle state to save power (e.g., a C-state defined in the ACPI specification). However, a hypervisor implementing prior power management techniques does not have visibility into guest scheduling decisions and may thus not be able to select a suitable power state for the CPU. The hypervisor may also need to re-enter a virtual machine to handle certain events, which may increase event handling latency. Furthermore, the hypervisor may rely on decisions made by a guest to manage CPU power. If the guest does not make the right decision as to power management, the CPU may appear to be busy to the hypervisor even when the guest is not performing any operation. As such, prior solutions for performing power management for virtualized computer systems may introduce additional overhead.

Aspects of the present disclosure address the above and other deficiencies by providing power management for a virtualized computer system utilizing enumerated power states. In accordance with some embodiments of the present disclosure, a hypervisor may perform power management for one or more virtual machines hosted on a host computer system. The hypervisor may assign a target latency time to a respective virtual machine running on the host computer system. The target latency time may represent a desired response latency for the virtual machine. Latency time may represent a delay between a time of a request to the virtual machine and a time of a response to the request by the virtual machine.

The hypervisor may also enumerate one or more power states for the virtual machine in view of the target latency time. For example, the hypervisor may identify one or more power states that a processor (e.g., CPU) of the host computer system may occupy (also referred to as the "processor power states"). The hypervisor may also determine a host latency time for each of the processor power states (e.g., in view of a time for the processor to enter and/or exit a given processor power state). The hypervisor may then compare the host latency times with the target latency time and map the processor power states to one or more power states to be implemented by the hypervisor for the virtual machine (also referred to as the "host power states"). For example, the hypervisor may remove one or more low-latency processor power states (e.g., processor power states associated with host latency times less than the target latency time) and an entry method involving a virtual machine (VM) exit. A virtual machine exit may involve a transfer of execution control of the virtual machine to the hypervisor from the virtual machine. As another example, the hypervisor may keep one or more low-latency processor power states that are not associated with an entry method involving a VM exit (e.g., by mapping each of the low-latency processor power states to a respective host power state). As still another example, the hypervisor may replace one or more processor power states associated with host latency times equal to or greater than the target latency time with a host power state associated with an entry method involving a VM exit.

The hypervisor may expose the host power states to the virtual machine. For example, the hypervisor may generate a data structure including a list of the host power states of the host power states and associating the data structure with the virtual machine. The data structure may be and/or include, for example, an ACPI processor object (e.g., a CST object defined by ACPI), a Low Power Idle (LPI) structure defined by ACPI, a Low Power Idle Table (LPIT)) defined by ACPI, etc. A guest operating system may perform power management for the virtual machine utilizing the host power states. For example, the guest operating system may determine an idle time for a virtual processor of the virtual machine and can compare the idle time with the target latency time. In view of a determination that the idle time is not less than the target latency time, the guest operating system can request the hypervisor to place the processor of the host computer system in a first host power state. The hypervisor may then fulfill the request by causing the virtual machine to exit to the hypervisor. Alternatively, in view of a determination that the idle time is less than the target latency time, the guest operating system can request the hypervisor to place the processor of the host computer system in a second host power state. The second host power state may be associated with a second host latency time that is less than the target latency time. To fulfill the request, the hypervisor may identify a processor power state corresponding to the second host power state (e.g., in view of mappings form the processor power states to the host power states). The hypervisor may then place the processor of the host computer system in the second processor power state.

The systems and methods described herein include technology that enhances virtualization technology for a computer system. In particular, aspects of the present disclosure provide technology that enhances the performance of power management and reduces overhead in a virtualized computer system. The technology may enable enhanced power management for virtual machines using enumerated host power states in view a target latency time of each of the virtual machines. Compared to conventional power management techniques, the mechanisms disclosed herein may enable host CPU sharing when guests enter low latency power states. This may improve performance of the virtualized computer system by reducing latency for power management while allowing CPU sharing.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, the computer system 100 is connected to a network 150 and comprises central processing unit (CPU) 160, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.) that serves as a secondary memory, interconnected as shown. The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

CPU 160 may occupy one or more power states (also referred to as the "processor power states"). For example, CPU 160 may occupy a processor power state where CPU 160 dispatches and executes instructions. As another example, CPU 160 may occupy a power saving state (e.g., lower-power idle states) where no instructions are executed and power consumption is reduced to a desired level. A given processor power states may be associated with an entry method that may be performed to place CPU 160 in the processor power state (e.g., entering the processor power state). The entry method may include execution of one or more instructions for CPU 160, such as a HALT instruction that halts CPU 160 (e.g., places CPU 160 in a HALT state) until an interruption is sent to CPU 160, a MWAIT instruction that may halt CPU 160 until data has been written a memory address within a designated range, etc. In some embodiments, the processor power states may include one or more processor idle states, such as one or more C-states in accordance with the Advanced Configuration and Power Interface (ACPI) standard.

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 runs a host operating system (OS) 120, which may comprise software, hardware, or both, that manages the hardware resources of the computer system and that provides functions such as inter-process communication, scheduling, virtual memory management, and so forth. In some examples, host operating system 120 also comprises a hypervisor 125, which provides a virtual operating platform for virtual machine (VM) 130 and that manages its execution. It should be noted that in some other examples, hypervisor 125 may be external to host OS 120, rather than embedded within host OS 120.

VM 130 may be a software implementation of a machine that executes programs as though it were an actual physical machine. It should be noted that although, for simplicity, a single virtual machine is depicted in FIG. 1, in some other embodiments computer system 100 may host a plurality of virtual machines. VM 130 is described in more detail below with respect to FIG. 2.

As shown, hypervisor 125 may include a host power management component 128 that can perform power management for CPU 160, VM 130, and/or any other suitable component of computer system 100. For example, the host power management component 128 may receive requests to place CPU 160 in a particular power state (e.g., from VM 130, etc.) and may fulfill such requests. In some embodiments, host power management component 128 may manage one or more processor power states that CPU 160 can occupy by mapping the processor power states to one or more power states to be implemented by hypervisor 125 (also referred to as the "host power states"). For example, host power management component 128 may determine a host latency time for each of the processor power states and may compare the host latency time to a target latency time associated with a VM 130. In some embodiments, hypervisor 125 and/or host power management component 128 may manage multiple VMs 130 hosted by computer system 100. Host power management component 128 may determine a target latency time for a respective VM 130. The target latency time may be determined in view of a user input of the target latency time, a desired response latency for the respective VM 130, etc. In some embodiments, a respective target latency time may be determined for each of a plurality of VMs 130. Hypervisor 125 and/or host power management component 128 may perform power management VMs 130 in view of the target latency times as described below.

Host power management component 128 may map the processor power states to the host power states in view of the comparison between each of the host latency times and the target latency time. For example, host power management component 128 may remove one or more low-latency processor power states (e.g., processor power states associated with host latency times less than the target latency time) and an entry method involving a virtual machine (VM) exit. A VM exit may involve a transfer of execution control of VM 130 to hypervisor 125 from VM 130.

As another example, host power management component 128 may keep one or more low-latency processor power states that are not associated with an entry method involving a VM exit (e.g., by mapping each of the low-latency processor power states to a respective host power state). As still another example, host power management component 128 may replace one or more processor power states associated with host latency times equal to or greater than the target latency time with a host power state associated with an entry method involving a VM exit.

Host power management component 128 may provide (e.g., expose) the host power states to VM 130. For example, host power management component 128 may generate one or more data structures including information of the host power states and may associate the data structures with VM 130. The information of the host power states may include, for example, a list of the host power states, a description of a host power state, a host latency time associated with a host power state, etc. Examples of the data structures may include a processor object (e.g., a_CST object defined by the ACPI), a data structure defining one or more low power idles states (e.g., a Low Power Idle (LPI) Structure in accordance with the ACPI, a Low Power Idle Table (LPIT) in accordance with the ACPI), etc.

Figure 2:
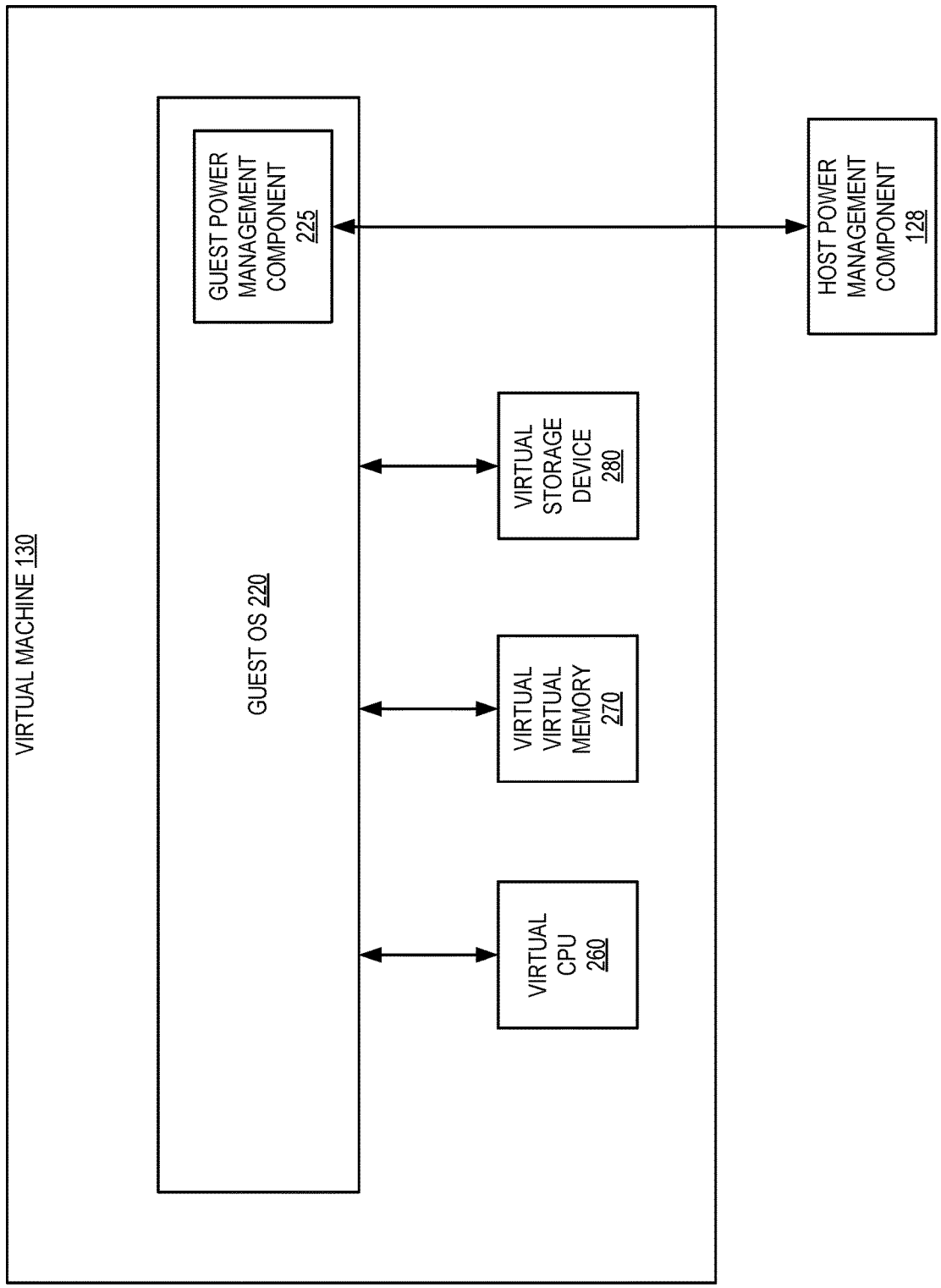
FIG. 2 depicts a block diagram of elements of a virtual machine, in accordance with an embodiment of the present disclosure

FIG. 2 depicts a block diagram of elements of VM 130, in accordance with an embodiment of the present disclosure. As shown in FIG. 2, VM 130 comprises a guest operating system 220, a virtual CPU 260, a virtual memory 270, and a virtual storage device 280.

Virtual CPU 260 may emulate a physical CPU and may map to central processing unit (CPU) 160. Similarly, virtual storage device 280 may emulate a physical storage device and maps to storage device 180. Virtual memory 270 may map virtual addresses of virtual machine 130 to addresses of the host OS 120's virtual memory, which in turn maps to physical addresses in main memory 170. In one embodiment, hypervisor 125 may manage these mappings in a transparent fashion, so that guest OS 220 and applications executing on virtual machine 130 interact with virtual CPU 260, virtual memory 270, and virtual storage device 280 as though they were actual physical entities. As noted above, in embodiments where computer system 100 comprises a plurality of CPUs 160, rather than a single CPU, virtual machine 130 may also comprise a plurality of virtual CPUs 260. Similarly, in embodiments where computer system 100 comprises a plurality of storage devices 180, rather than a single storage device, virtual machine 130 may also comprise a plurality of storage devices 180.

Guest operating system (OS) 220 manages virtual machine resources and provides functions such as inter-process communication, scheduling, memory management, and so forth. As shown, guest OS 220 may include a guest power management component 225 that can perform power management for VM 130. For example, guest power management component 225 may determine when virtual CPU 260 is to be idle and estimate an idle time for virtual CPU 260. Guest power management component 225 may select one or more power states in view of the idle time send requests to hypervisor 125 to place CPU 160 in particular power states. For example, guest power management component 225 may determine that the idle time is not less than a target latency time associated with the virtual machine. In view of the determination, guest power management component 225 can select a first host power state that is associated with a host latency time that is not less than the target latency time. The first host power state may be associated with an entry method involving a VM exit (causing VM 130 to exit to hypervisor 125). Guest power management component 225 can also send, to host power management component 128, a request to place CPU 160 in the first host power state. Upon receiving the request to place CPU 160 in the first host power state, host power management component 128 can cause VM 130 to exit to hypervisor 125.

Alternatively, guest power management component 225 can determine that the idle time is less than the target latency time. In view of the determination, guest power management component 225 can select a second host power state associated with a host latency time that is less than the target latency time. Guest power management component 225 can also send, to host power management component 125 a request to place CPU 160 in the second host power state. Upon receiving the request to place CPU 160 in the second host power state, the host power management component 128 can identify a processor power state corresponding to the second host power state (e.g., in view of mapping data that maps one or more processor power states of CPU 160 to one or more host power states) and can place CPU 160 in the identified power state. In some embodiments, guest OS 220 and/or guest power management 225 can perform one or more portions of process 900 of FIG. 9.

Figure 3:
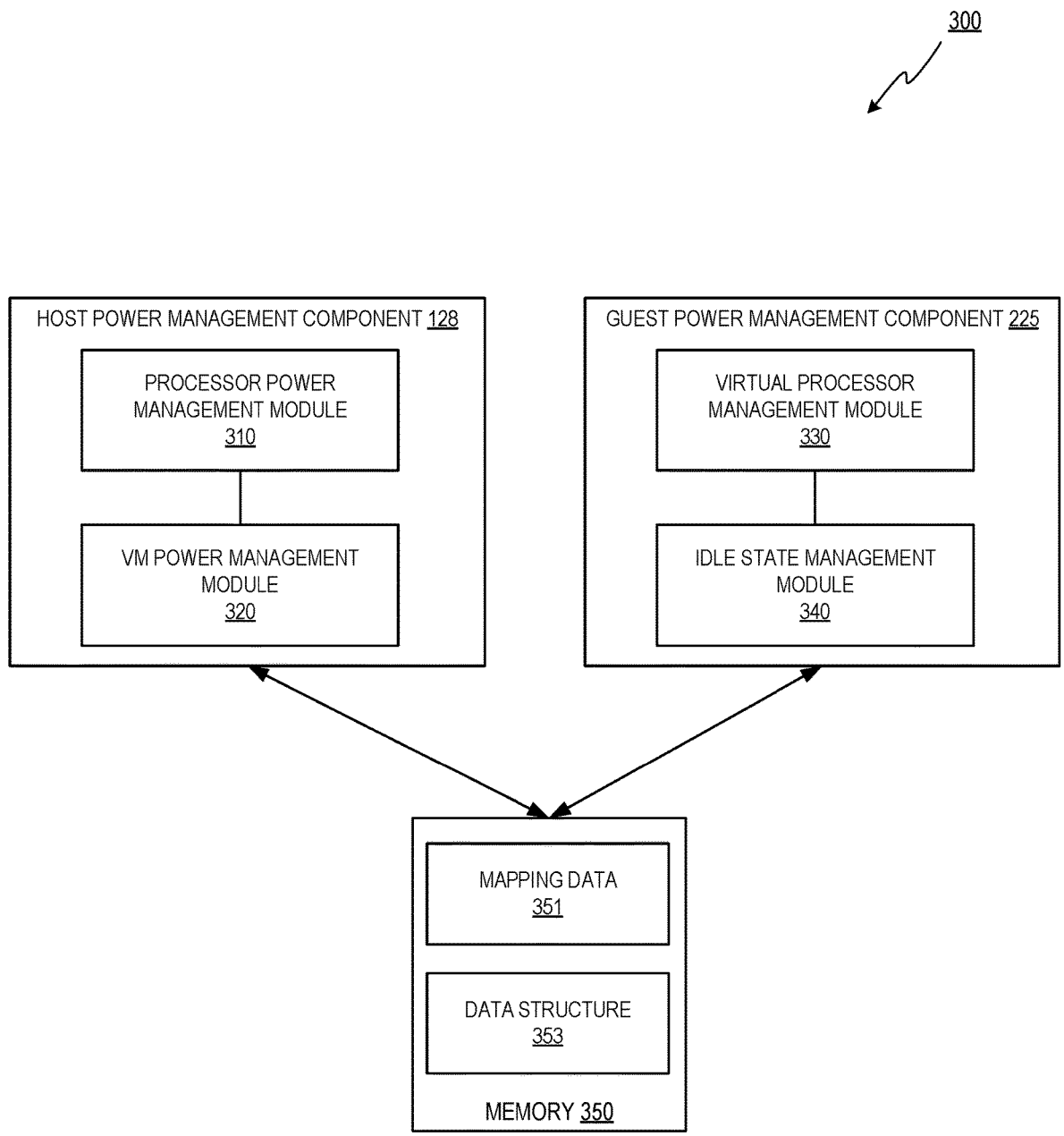
FIG. 3 is a block diagram of a detailed view of a computer system implementing a host power management component and a guest power management component according to an implementation of the disclosure.

FIG. 3 depicts a block diagram illustrating an example 300 of a computer system in accordance with some implementations of the disclosure. The host power management component and the guest power management component of FIG. 3 may be the same as the host power management component 128 and guest power management component 225 of FIG. 1. As illustrated, the host power management component may include a processor power management module 310 and a virtual machine (VM) power management module 320. The guest power management component may include a virtual processor management module 330 and an idle state management module 340. The host power management component and/or the guest power management component may be coupled to memory 350 or any other suitable memory that stores data that can be used to implement various embodiments of the present disclosure. More or fewer components may be included without loss of generality. For example, two or more of the components or portions of the components may be combined into a single component, or one of the components may be divided into two or more modules. In one implementation, one or more of the modules may be executed by different processing devices on different computing devices (e.g., different server computers).

The processor power management module 310 may perform power management for one or more processors of a host computer system (e.g., CPU 160 of FIG. 1). For example, the processor power management module 310 may identify one or more processor power states that a processor of the host computer system may occupy (e.g., one or more C-states). The processor power management module 310 may also enumerate one or more host power states to be implemented by the hypervisor in view of the processor power states. For example, the processor power management module 310 may determine a host latency time for each of the processor power states and may compare the host latency time to a target latency time. The processor power management module 310 may then map the processor power states to the host power states in view of the comparison. For example, in response to determining that a first host latency time for a first processor power state is less than the target latency time and that the first processor power state is associated with a first entry method that does not comprise causing the virtual machine to exit to the hypervisor, the processor power management module 310 may map the first processor power state to a first host power state associated with the first entry method. As another example, in response to determining that a second host latency time for a second processor power state is not less than the target latency time, the processor power management module 310 can map the second processor power state to a second host power state associated with a second entry method. The second entry method may include causing the virtual machine to exit to the hypervisor. As a further example, in response to determining that a third host latency time for a third processor power state is less than the target latency time and that the third processor power state is associated with a third entry method involving causing the virtual machine to exit to the hypervisor, the processor power management module 310 may disassociate the third processor power state from the virtual machine (e.g., not mapping the third processor power state to a host power state to be associated with the virtual machine).

The processor power management module 310 may associate a processor power state with its corresponding a host power state. For example, the processor power management module 310 may cause information related to the processor power state (e.g., a host latency time, a description of the processor power state, an entry method of the) to be stored in association with information related to the host power state (e.g., a description of the host power state, an entry method of the host power state, a target latency time). As such, the host power state and the processor power state may be associated with the same host latency time. In some embodiments, the processor power management module 310 may also generate one or more mapping data 351 that may be used to map a particular processor power state to a corresponding host power state. The mapping data 351 may include the information related to the processor power states, the information related to the host power states, the correspondence between a given a processor power state and its corresponding host power state, etc. In one implementation, the mapping data 350 may be stored in a storage device accessible to the guest power management component (e.g., memory 350). In another implementation, the mapping data 350 may be stored in a storage device that is accessible to the host power management component but not accessible to the guest power management component.

The processor power management module 310 may expose the host power states to the VM. For example, the processor power management module 310 may generate a data structure 353 including a list of the host power states and may associate the data structure with the VM (e.g., by storing the data structure in a storage device accessible to the VM). The data structure may include any suitable information related to the host power states, such as a description of a given host power state, an entry method of the given host power state, a host latency time associated with the given host power state and/or a processor power state corresponding to the given host power state, etc. The data structure may be and/or include, for example, an ACPI processor object (e.g., a_CST object), a LPI structure, a table (e.g., a LPIT), etc.

The virtual processor management module 330 of the guest power management component may manage one or more virtual processors of the virtual machine (e.g., one or more virtual CPU 260 of FIG. 2). For example, the virtual processor management module 330 may monitor a virtual processor of the virtual machine to determine whether the virtual processor is in an idle state and/or is to be idle (e.g., by determining whether one or more tasks are scheduled for execution by the virtual machine, by determining whether one or more interrupts are scheduled for and/or expected to be scheduled for the virtual processor within a given time interval). In response to determining that the virtual processor is to be idle, the virtual processor management module 330 may determine an idle time for the virtual processor. In some embodiments, the virtual processor management module 330 may also provide the idle time to the host power management component (e.g., by sending one or more messages to the VM power management module 320).

The idle state management module 240 can select a host power state exposed to the virtual machine by the hypervisor in view of the idle time to perform power management for the virtual processor. For example, the idle state management module 240 may compare the idle time with the target latency time and select a host power state in view of the comparison. In one implementation, the idle state management module 240 may determine that the idle time is not less than the target latency time and may then select a host power state that is associated with a host latency time equal to or greater than the target latency time. The selected host power state may be associated with an entry method involving a VM exit (e.g., causing the virtual machine to exit to the hypervisor).

In another implementation, the idle state management module 240 may determine that the idle time is less than the target latency time and may then select a host power state that is associated with a host latency time that is less than the target latency time. The selected host power state is not associated with an entry method that involves a VM exit. The idle state management module 240 may also provide information about the selected host power state to the host power management component. For example, the idle state management module 240 may send a request to place the processor of the host computer system in the selected host power state.

The VM power management module 320 may receive the request to place the processor of the host computer system in the selected host power state and may fulfill the request. For example, the VM power management module 320 may cause the VM to exit to the hypervisor in response to receiving a request to place the processor in a host power state that is associated with a host latency time equal to or greater than the target latency time. As another example, upon receiving a request to place the processor in a host power state that is associated with a host latency time that is less than the target latency time, the VM power management module 320 may identify a processor power state corresponding to the host power state (e.g., in view of the mapping data 351). The VM power management module 320 can then place the processor in the identified processor power state.

Figure 4:
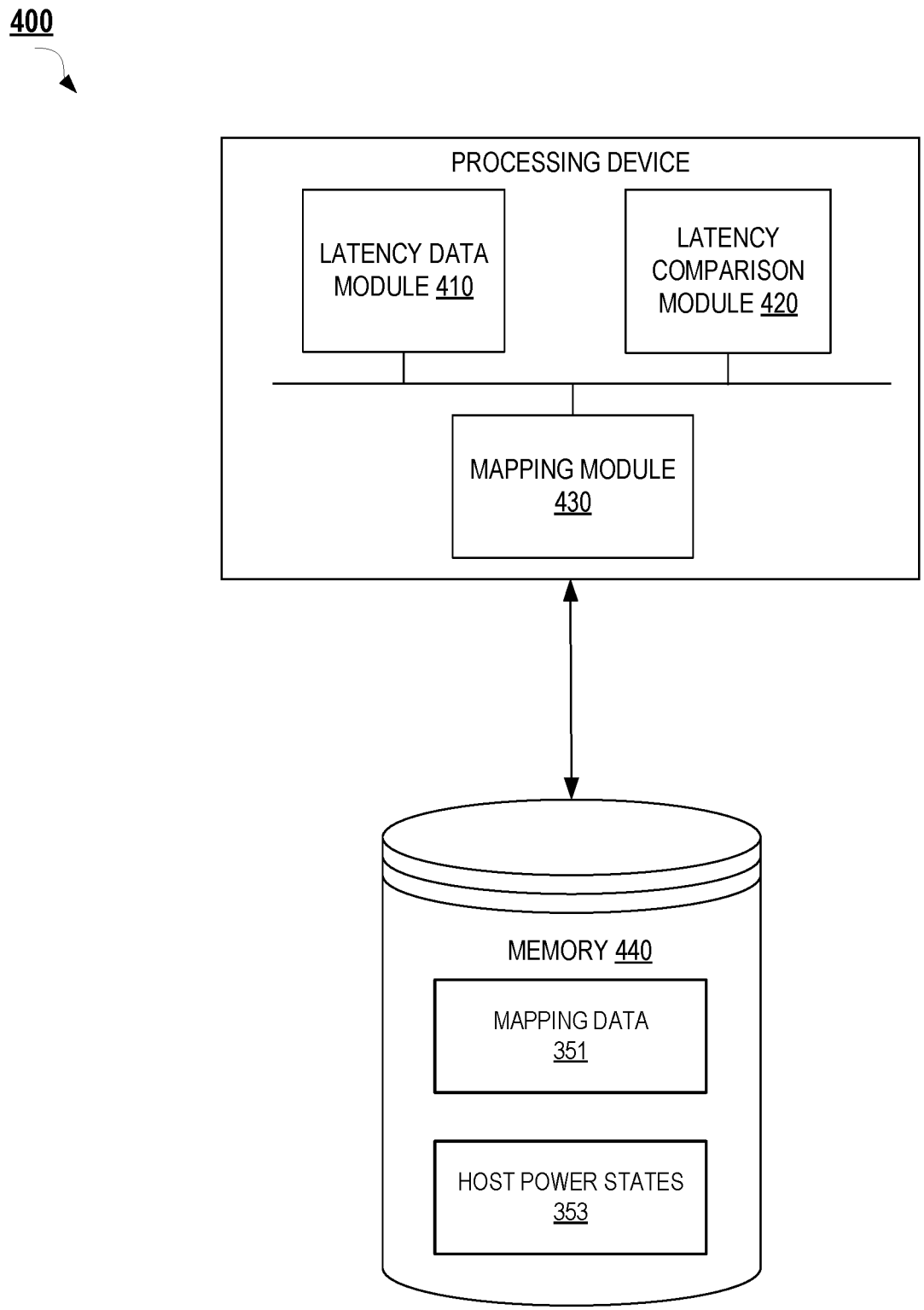
FIGS. 4, 5, and 6 depict block diagrams of example computer systems operating in accordance with one or more aspects of the present disclosure.
Figure 5:
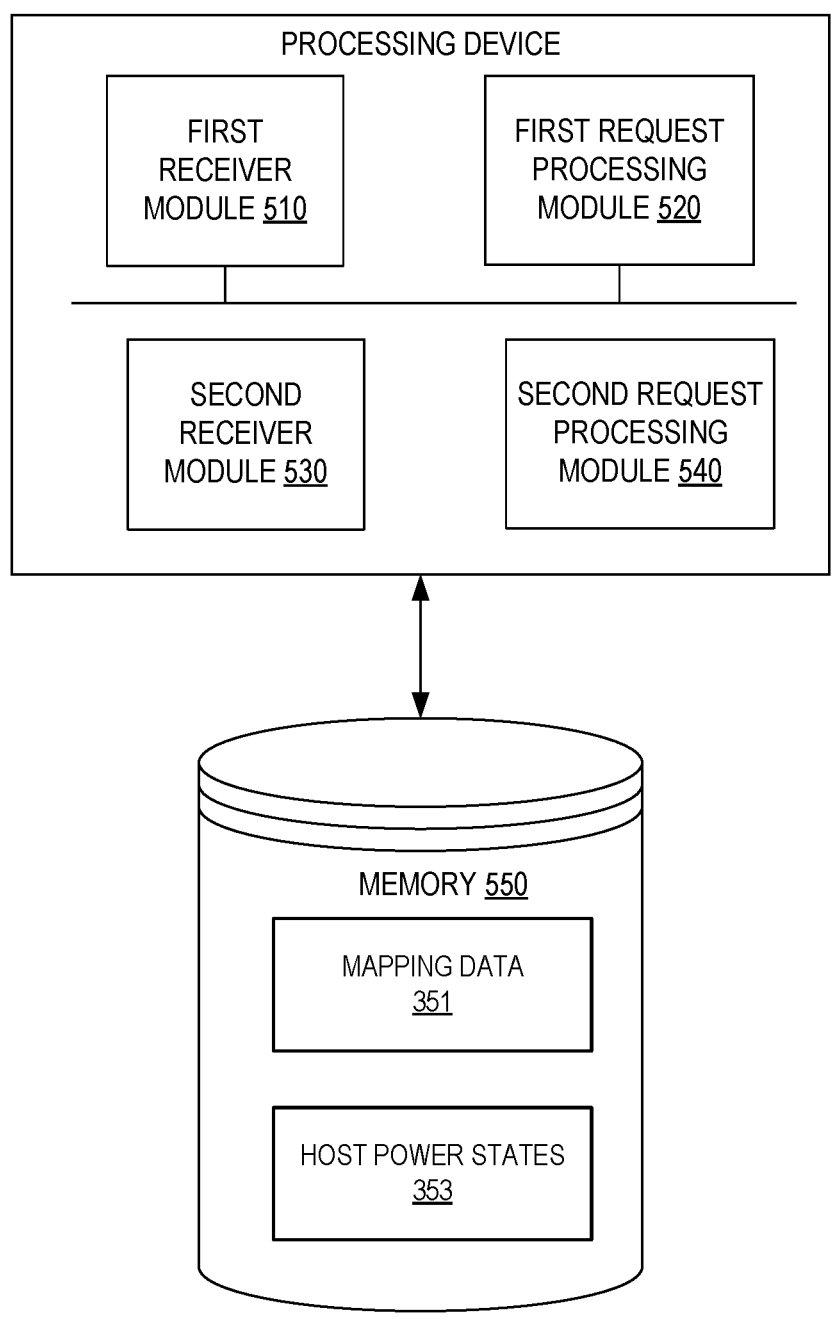
Figure 6:
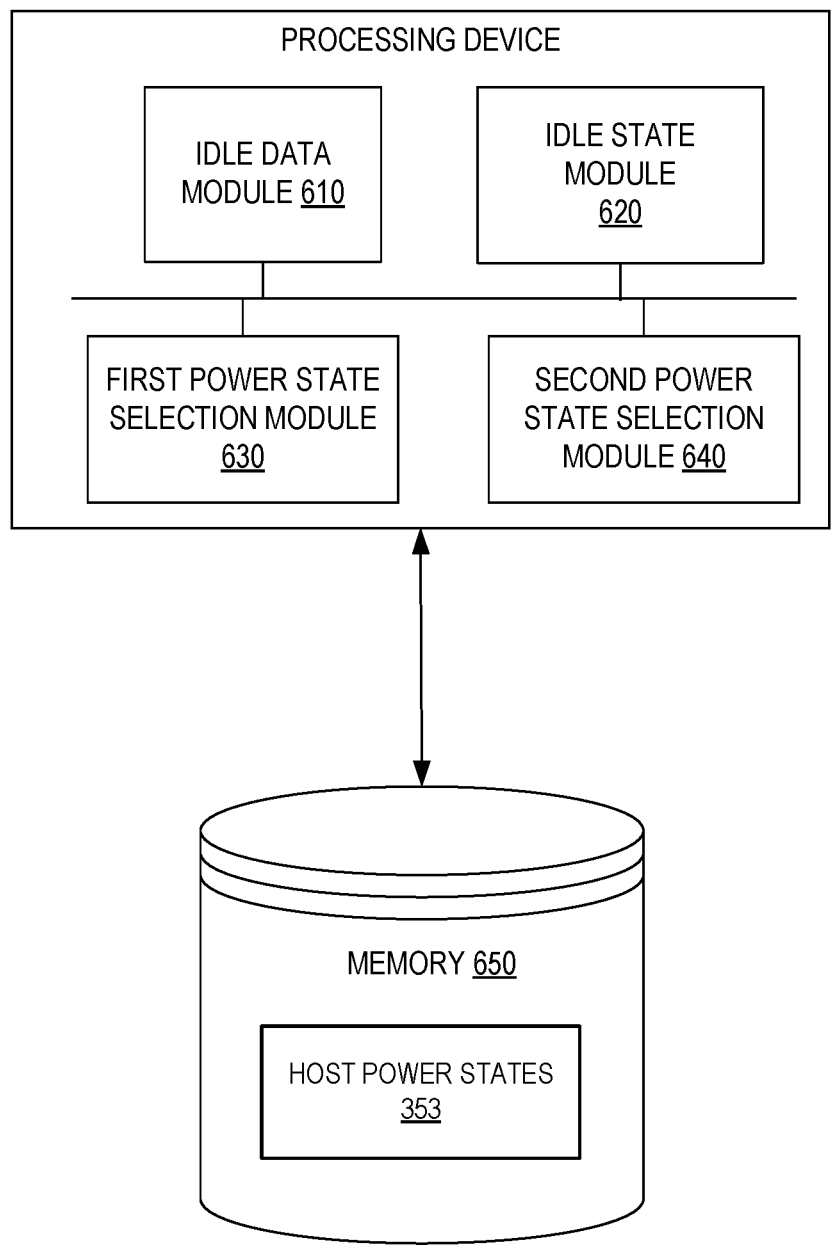

FIGS. 4, 5, and 6 depict block diagrams of example computer systems operating in accordance with one or more aspects of the present disclosure. Each of computer systems 400, 500, and 600 may be the same or similar to computer system 100 and may include one or more processing devices and one or more memory devices.

Referring to FIG. 4, computer system 400 may include a latency data module 410, a latency comparison module 420, and a mapping module 430. The computer system 400 may further include a memory 440 storing the mapping data 351, the host power states 353, and/or any other suitable data in accordance with the present disclosure.

The latency data module 410 can generate latency data for one or more power states. For example, the latency data module 410 can determine a host latency time for a processor power states that a processor of a host computer system can occupy. The host latency time may be determined, for example, in view of one or more of a time for entering the processor power state, a time for exiting the processor power state, a time for entering execution of the virtual machine by the processor, a time for exiting execution of the virtual machine by the processor, a time for the hypervisor to enter an idle state, a time for the hypervisor to exit the idle state, etc. In some embodiments, the latency data module 410 may determine a host latency time for each of a plurality of processor power states that the processor can occupy. The processor power states may include one or more power saving states (e.g., one or more C-states).

The latency comparison module 420 may compare latency data generated by the latency data to target latency data. For example, the latency comparison module 420 may determine a target latency time for a virtual machine hosted on the host computer system. The latency comparison module 420 may also compare one or more host latency times for the processor power states of the processor with the target latency time and may determine whether each of the host latency times is less than the target latency time. The latency comparison module 420 may also provide results of the comparison to the mapping module 430 for further processing.

The mapping module 430 may map the processor power states to one or more host power states in view of the comparison results provided by the latency comparison module 420. For example, the mapping module 430 may map a first processor power state associated with a first entry method to a first host power state associated with the first entry method in view of a determination that a first host latency time for the first processor power state is less than the target latency time and that the first entry method that does not comprise halting the processor. As another example, in view of a determination that a second host latency time for a second processor power state is not less than the target latency time, the mapping module 430 may map the second processor power state to a second host power state that is associated with a second entry method comprising causing the virtual machine to exit to the hypervisor. As a further example, in view of a determination that a third host latency time for a third processor power state is less than the target latency time and that the third processor power state is associated with a third entry method that involves halting the processor, the mapping module 430 may disassociate the third processor power state from the virtual machine. In some embodiments, to dissociate the third processor power state from the virtual machine, the mapping module 430 does not map the third processor power state to any host power state associated with the virtual machine. As such, the host power states generated for the virtual machine does not comprise a host power state corresponding to the third processor power states.

Referring to FIG. 5, computer system 500 may include a first receiver module 510, a first request processing module 520, a second receiver module 530, and a second request processing module 540. The computer system 500 may further include a memory 550 storing the mapping data 351, the host power states 353, and/or any other suitable data in accordance with the present disclosure.

The first receiver module 510 may receive requests to place a processor of a host computer system in a lower-latency power state from one or more virtual machines. For example, the first receiver module 510 can receive from a virtual machine, a first request to place the processor in a first host power state. The first request may include information that can be used to identify the first host power state. The first host power state may be associated with a first host latency time that is less than a target latency time. The first host power state may be mapped to a first processor power state of the processor. The first host latency time may correspond to a host latency time determined for the first processor power state.

The first request processing module 520 can process the requests received by the first receive module 520. For example, the first request processing module 520 can cause the processor to be placed in a first processor power state corresponding to the first host power state in view of the first request. For example, the hypervisor may determine that the first processor power state corresponds to the first host power state (e.g., in view of mapping data 351). To place the processor in the first processor power state, the first request processing module 520 may execute an entry method associated with the first processor power state. In some embodiments, the entry method does not involve causing the virtual machine to exit to the hypervisor (e.g., execution of a HALT instruction that halts the processor).

The second receiver module 530 may receive one or more requests to place the processor in a power state that is not a low-latency power state. For example, the second receiver module 530 may receive, from the virtual machine, a second request to place the processor in a second host power state associated with a second host latency time that is not less than the target latency time associated with the target latency time.

The second request processing module 540 may process requests received by the second receiver module 530. For example, the second request processing module 520 may cause the virtual to exit to the hypervisor in view of the second request.

Referring to FIG. 6, computer system 600 may include an idle data module 610, an idle state module 620, a first power state selection module 630, and a second power state selection module 640. The computer system 600 may further include a memory 650 storing the host power states 353 and/or any other suitable data in accordance with the present disclosure.

The idle data module 610 can determine an idle time for a virtual processor of a virtual machine. For example, the idle data module 610 can determine the idle time in view of historical idle times (e.g., by computing an average of prior processor idle times, by computing an exponential time-decayed average of prior processor idle times). In some embodiments, the idle data module 610 may provide the idle time to the idle state module 620, a hypervisor, etc. for further processing.

The idle state module 620 can compare the idle time with a target latency time associated with the virtual machine and may determine whether the idle time is less than the target latency time. The idle state module 620 may provide a result of the comparison (e.g., a determination that the idle time is less than the target latency time, a determination that the idle time is equal to or greater than the target latency time) to the first power state selection module 630, the second power state selection module 640, the hypervisor, etc. for further processing.

The first power state selection module 630 may select a host power state that is associated with a host latency time that is not less than the target latency time (a first host power state) in view of a determination that the idle time is not less than the target latency time. The first host power state may be associated with an entry method involving a VM exit (e.g., causing the virtual machine to exit to the hypervisor). The first power state selection module 630 may also generate and/or transmit a request to place a processor of the host computer in the first host power state.

The second power state selection module 640 may select a host power state that is associated with a host latency time is less than the target latency time (a second host power state) in view of a determination that the idle time is less than the target latency time. The second host power state may correspond to a processor power state that is not associated with an entry method involving a VM exit. The second power state selection module 630 may also generate and/or transmit a request to place a processor of the host computer in the second host power state.

Figure 7:
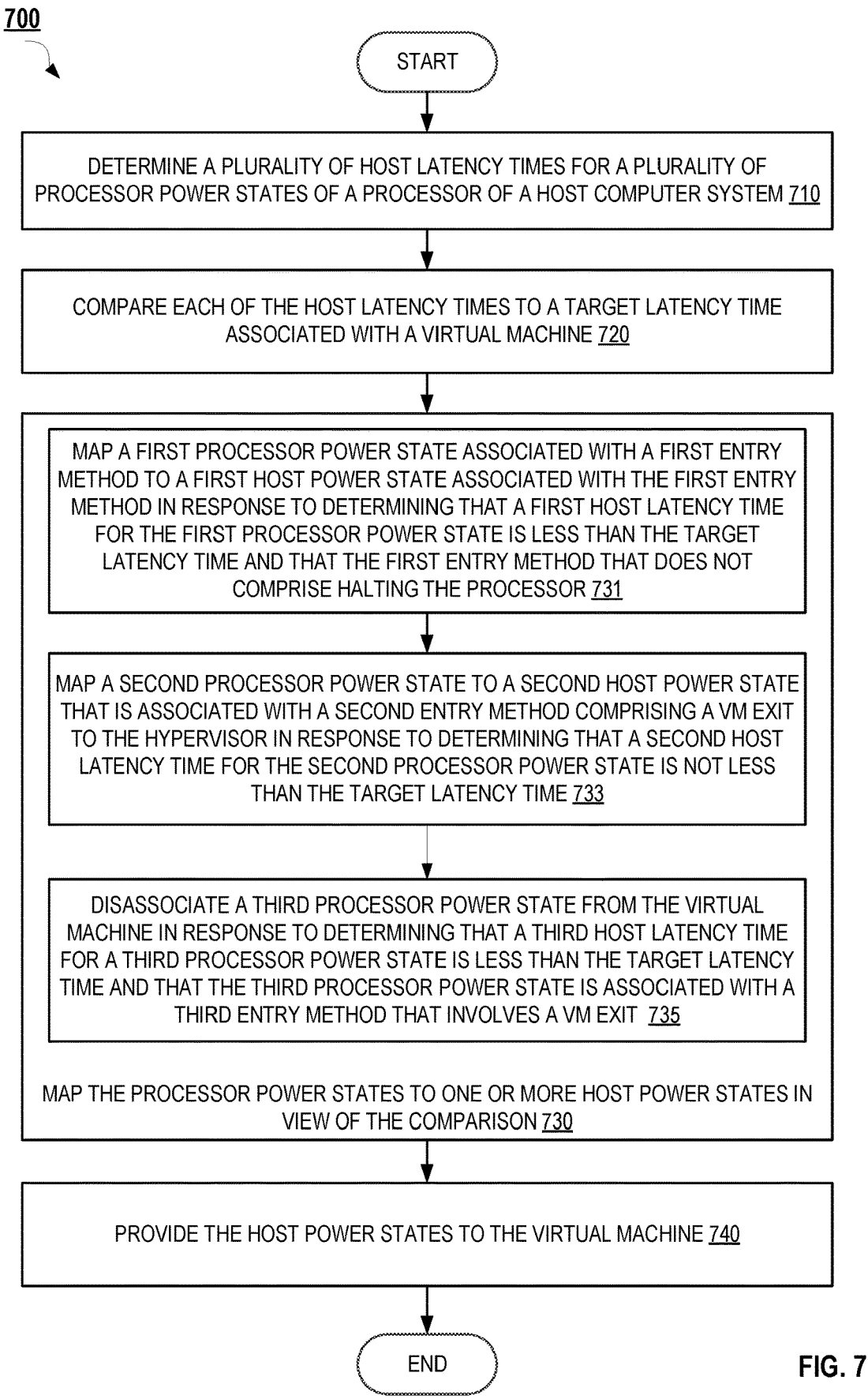
FIG. 7 is a flow diagram illustrating a method for managing power states of a processor of a host computer system in accordance with some embodiments of the present disclosure.
Figure 8:
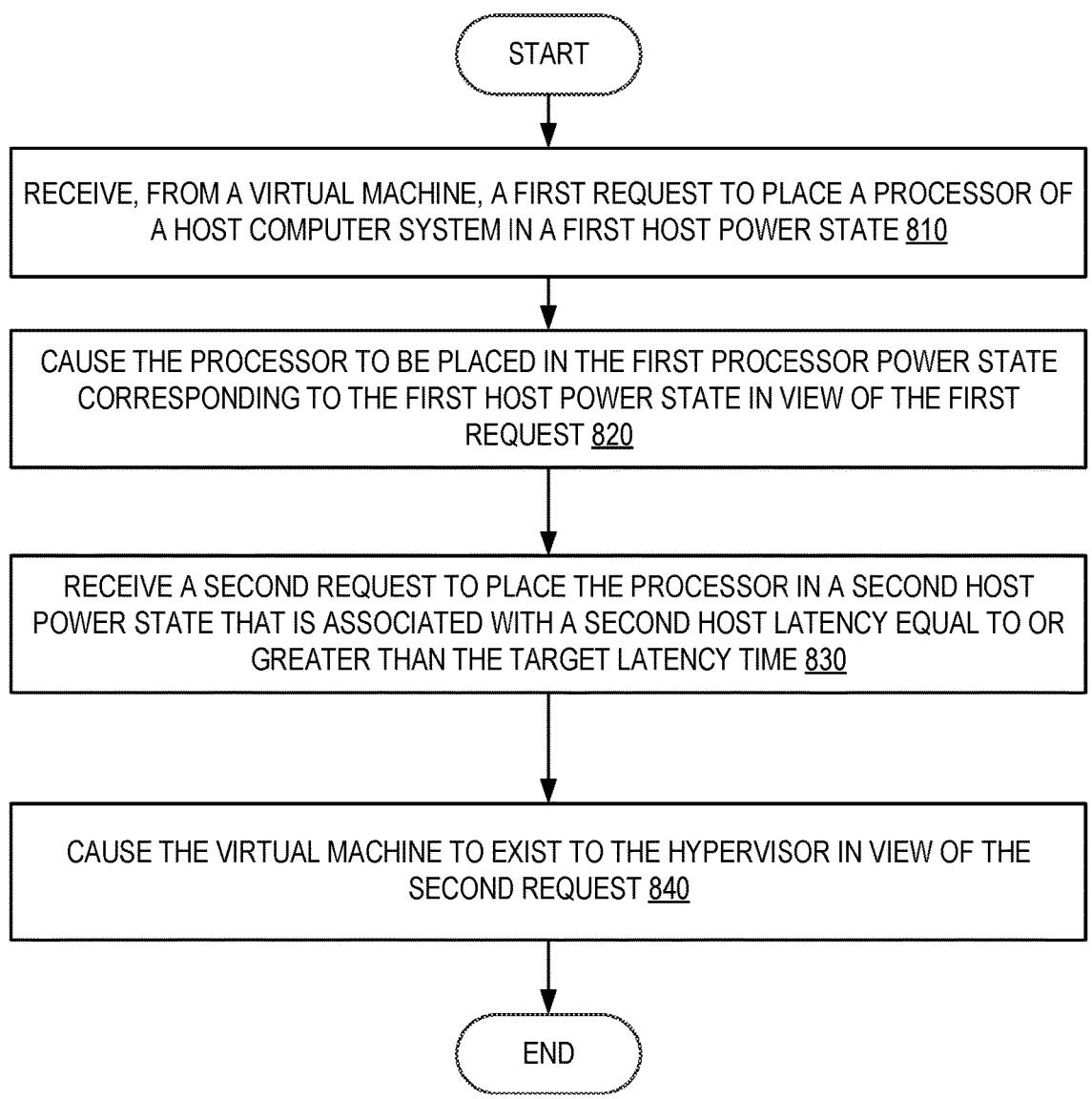
FIG. 8 is a flow diagram illustrating a method for performing power management for a virtualized computer system by a hypervisor in accordance with some embodiments of the present disclosure.
Figure 9:
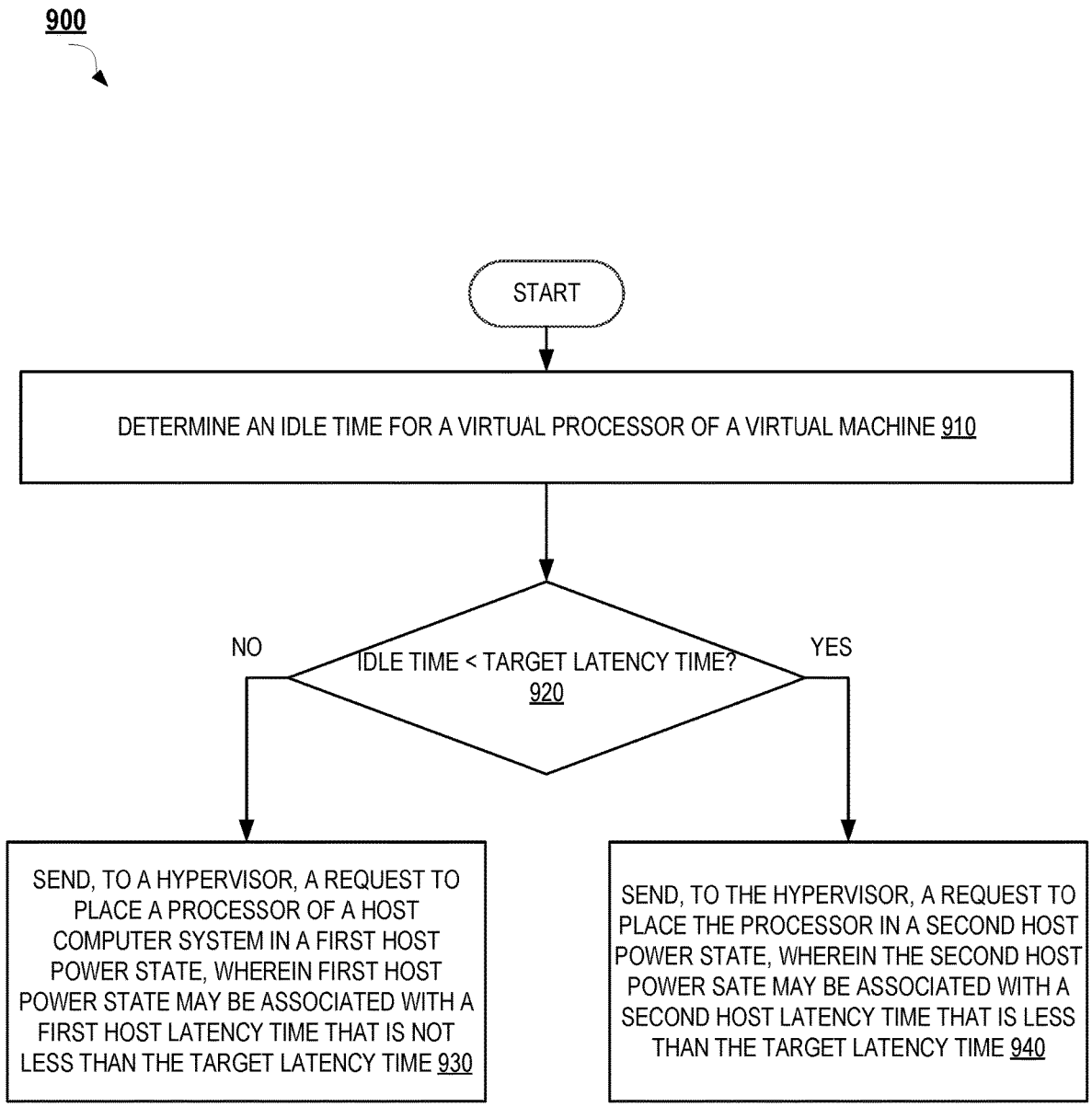
FIG. 9 is a flow diagram illustrating a method for performing power management by a virtual machine in accordance with some embodiments of the present disclosure.

FIGS. 7, 8, and 9 are flow diagrams illustrating methods 700, 800, and 900 for memory management in a virtualized computer system in accordance with one or more aspects of the present disclosure. Method 700 illustrates an example process for managing power states of a processor of a host computer system in accordance with some embodiments of the present disclosure. Method 800 illustrates an example process for performing power management by a hypervisor in accordance with some embodiments of the present disclosure. Method 900 illustrates an example process for performing power management by a virtual machine in accordance with some embodiments of the present disclosure. Methods 700, 800, and 900 may be performed by processing devices that may comprise hardware (e.g., circuitry, dedicated logic, programmable logic, microcode, etc.), executable code (such as is run on a general-purpose computer system or a dedicated machine), or a combination of both. Methods 700, 800, and 900 and each of their individual functions, routines, subroutines, or operations may be performed by one or more processors of the computer device executing the method. In certain implementations, methods 700, 800, and 900 may each be performed by a single processing thread. Alternatively, methods 700, 800, and 900 may be performed by two or more processing threads, each thread executing one or more individual functions, routines, subroutines, or operations of the method. In an illustrative example, the processing threads implementing methods 700, 800, and 900 may be synchronized (e.g., using semaphores, critical sections, and/or other thread synchronization mechanisms). Alternatively, the processes implementing methods 700, 800, and 900 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 700, 800, and 900 may be performed by computer system 100 as shown in FIGS. 1 and 2.

Refereeing to FIG. 7, method 700 begins at block 710 where the hypervisor may determine a plurality of host latency times for a plurality of processor power states of a processor of a host computer system. Each of the processor power states may be and/or include a power state supported by the processor. In some embodiments, the processor power states may include one or more processor idle states, such as one or more C-states defined by ACPI.

The hypervisor may determine a host latency time for a respective processor power state in view of one or more of a time for entering the processor power state, a time for exiting the processor power state, a time for entering execution of the virtual machine by the processor, a time for exiting execution of the virtual machine by the processor, a time for the hypervisor to enter an idle state, a time for the hypervisor to exit the idle state, etc. In some embodiments, the hypervisor may determine one or more of the host latency times in view of information provided by a guest OS of the virtual machine. For example, the hypervisor may receive one or more of the host latency times from the guest OS. As another example, the hypervisor may receive information that may be used to determine the host latency times (e.g., time for entering the processor power state, a time for exiting the processor power state) from the guest OS.

At block 720, the hypervisor may compare each of the host latency times to a target latency time associated with a virtual machine. The virtual machine may be running on the host computer system. The hypervisor may determine whether a respective host latency time is less than the target latency time.

At block 730, the hypervisor may map the processor power states to one or more host power states in view of the comparison. For example, at block 731, the hypervisor may map a first processor power state associated with a first entry method to a first host power state associated with the first entry method in response to determining that a first host latency time for the first processor power state is less than the target latency time and that the first entry method that does not comprise halting the processor.

As another example, at block 733, in response to determining that a second host latency time for a second processor power state is not less than the target latency time, the hypervisor may map the second processor power state to a second host power state that is associated with a second entry method comprising causing the virtual machine to exit to the hypervisor.

As a further example, at block 735, in response to determining that a third host latency time for a third processor power state is less than the target latency time and that the third processor power state is associated with a third entry method that involves halting the processor, the hypervisor may disassociate the third processor power state from the virtual machine. In some embodiments, to dissociate the third processor power state from the virtual machine, the hypervisor does not map the third processor power state to any host power state associated with the virtual machine. As such, the plurality of host power states does not comprise a host power state corresponding to the third processor power states.

In some embodiments, at block 740, the hypervisor may provide the plurality of host power states to the virtual machine. For example, the hypervisor may generate a data structure including information of the host power states (e.g., a list of the host power states, a description of each of the host power states, an entry method for each of the host power states, a host latency associated with each of the host power states, etc.). The hypervisor may also associate the data structure with the virtual machine (e.g., by storing the data structure in a storage device accessible to the virtual machine). Examples of the data structure may include a table, a processor object, etc. In some embodiments, the data structure may include a_CST object, a LPI structure, and/or a LPIT in accordance with the ACPI.

Refereeing to FIG. 8, method 800 begins at block 810 where the hypervisor may receive, from a virtual machine, a first request to place a processor of a host computer system in a first host power state. The first host power state may be associated with a first host latency time that is less than a target latency time. The first host power state may be mapped to a first processor power state of the processor. The first host latency time may correspond to a host latency determined for the first processor power state and may represent one or more of a time for entering the first processor power state, a time for exiting the first processor power state, a time for entering execution of the virtual machine by the processor, a time for exiting execution of the virtual machine by the processor, a time for the hypervisor to enter an idle state, a time for the hypervisor to exit the idle state, etc.

At block 820, the hypervisor may cause the processor to be placed in the first processor power state corresponding to the first host power state in view of the first request. For example, the hypervisor may determine that the first processor power state corresponds to the first host power state (e.g., in view of a data structure including mappings from a plurality of processor power states to a plurality of host power states). The hypervisor may execute an entry method associated with the first processor power state to place the processor in the first processor power state. In some embodiments, the entry method associated with the first processor power state does not involve causing the virtual machine to exit to the hypervisor (e.g., execution of a HALT instruction that halts the processor).

At block 830, the hypervisor may receive a second request to place the processor in a second host power state that is associated with a second host latency equal to or greater than the target latency time. At block 840, the hypervisor may cause the virtual machine to exist to the hypervisor in view of the second request.

Refereeing to FIG. 9, method 900 begins at block 910 where a guest OS of a virtual machine may determine an idle time for a virtual processor of the virtual machine. For example, the guest OS can determine the idle time in view of historical idle times (e.g., by computing an average of prior processor idle times, by computing an exponential time-decayed average of prior processor idle times). In some embodiments, the guest OS may provide the idle time to a hypervisor that manages the virtual machine (e.g., by sending one or more messages to the hypervisor).

In some embodiments, the guest OS may estimate the idle time in response to determining that the virtual processor is to be idle. As an example, the guest OS may determine that the virtual processor is to be idle in response to determining that there are no tasks scheduled for execution by the virtual processor. As another example, the guest OS may determine that the virtual processor is to be idle in response to determining that there are no interrupts currently scheduled for and/or expected to be scheduled for the virtual processor within a given time interval.

At block 920, the guest OS may compare the idle time with a target latency time and may determine whether the idle time is less than the target latency time. In some embodiments, in response to determining that the idle time is not less than the target latency time, the guest OS may proceed to block 930 and may send, to a hypervisor, a request to place a processor of a host computer system in a first host power state. The first host power state may be associated with a first host latency time that is not less than the target latency time. The first host power state may be associated with an entry method that performs a virtual machine exit.

Alternatively, in response to determining that the idle time is less than the target latency time, the guest OS may proceed to block 940 and may send, to the hypervisor, a request to place the processor in a second host power state. The second host power state may be associated with a second host latency time that is less than the target latency time. The processor power state may be and/or include a C-state defined by ACPI. The second host power state may correspond to a processor power state of a processor of the host computer system. The processor power state may be mapped to the second host power state in accordance with FIG. 7 above.

Figure 10:
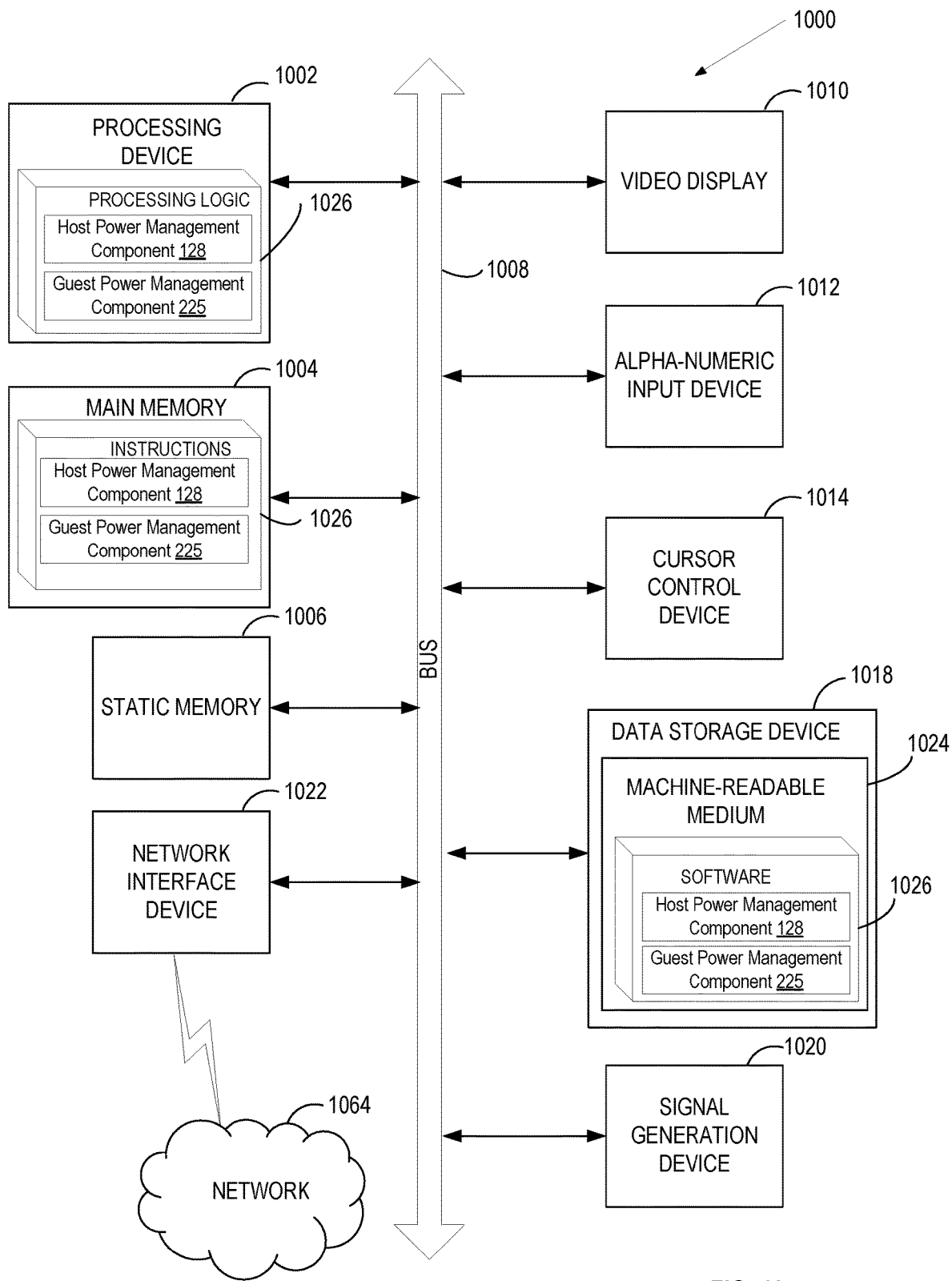
FIG. 10 illustrates a block diagram of one implementation of a computer system.

FIG. 10 illustrates a diagrammatic representation of a machine in the example form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1000 includes a processing device 1002 (e.g., processor, CPU, etc.), a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 408.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute the processing logic 426 for performing the operations and steps discussed herein.

The computer system 1000 may further include a network interface device 1022 communicably coupled to a network 1064. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1018 may include a machine-accessible storage medium 1024 on which is stored software 1026 embodying any one or more of the methodologies of functions described herein. The software 1026 may also reside, completely or at least partially, within the main memory 1004 as instructions 1026 and/or within the processing device 1002 as processing logic 1026 during execution thereof by the computer system 1000; the main memory 1004 and the processing device 1002 also constituting machine-accessible storage media.

The machine-readable storage medium 1024 may also be used to store instructions 1026 to perform power management for virtualized computer systems, such as the host power management component 128 and the guest power management component 225 as described with respect to FIGS. 1 and 2, and/or a software library containing methods that call the above applications. While the machine-accessible storage medium 1024 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Other computer system designs and configurations may also be suitable to implement the system and methods described herein. The following examples illustrate various implementations in accordance with one or more aspects of the present disclosure.

Example 1 is a method comprising: determining a plurality of host latency times for a plurality of processor power states of a processor of a host computer system; comparing, by a hypervisor executed on the host computer system, each of the host latency times to a target latency time associated with a virtual machine running on the host computer system; mapping the plurality of processor power states to a plurality of host power states in view of the comparison; and providing, by the hypervisor, the plurality of host power states to the virtual machine.

Examiner 2 includes the subject matter of example 1, wherein mapping the plurality of processor power states of the processor to the plurality of host power states in view of the comparison comprises: in response to determining that a first host latency time for a first processor power state of the plurality of processor power states is less than the target latency time and that the first processor power state is associated with a first entry method that does not comprise causing the virtual machine to exit to the hypervisor, mapping the first processor power state to a first host power state of the plurality of host power states, wherein the first host power state is associated with the first entry method.

Examiner 3 includes the subject matter of example 2, wherein determining the plurality of host latency times comprises determining the first host latency time in view of at least one of a time for entering the first processor power state, a time for exiting the first processor power state, a time for entering execution of the virtual machine by the processor, a time for exiting execution of the virtual machine by the processor, a time for the hypervisor to enter an idle state, or a time for the hypervisor to exit the idle state.

Examiner 4 includes the subject matter of example 1, wherein mapping the plurality of processor power states of the processor to the plurality of host power states in view of the comparison comprises: in response to determining that a second host latency time for a second processor power state of the plurality of processor power states is not less than the target latency time, mapping the second processor power state to a second host power state of the plurality of host power states, wherein the second host power state is associated with a second entry method comprising causing the virtual machine to exit to the hypervisor.

Examiner 5 includes the subject matter of example 1, wherein mapping the plurality of processor power states of the processor to the plurality of host power states in view of the comparison comprises: in response to determining that a third host latency time for a third processor power state of the plurality of processor power states is less than the target latency time and that the third processor power state is associated with a third entry method that comprises causing the virtual machine to exit to the hypervisor, disassociating the third processor power state from the virtual machine.

Examiner 6 includes the subject matter of example 4, wherein the plurality of host power states does not comprise a host power state corresponding to the third processor power state.

Examiner 7 includes the subject matter of example 1, wherein providing the plurality of host power states to the virtual machine comprises: generating a data structure including information related to the plurality of host power states; and associating the data structure with the virtual machine.

Examiner 8 includes the subject matter of example 7, wherein the data structure comprises at least one of a processor object or a Low Power Idle (LPI) structure, and wherein the information related to the plurality of host power states comprises a list of the host power states.

Examiner 9 includes the subject matter of example 8, wherein the data structure comprises at least one of a_CST object or a Low Power Idle (LPI) table defined by Advanced Configuration and Power Interface (ACPI).

Example 10 includes a method comprising: receiving, from a virtual machine, a first request to place a processor of a host computer system in a first host power state, wherein the first host power state is associated with a first host latency time that is less than a target latency time; in response to receiving the first request, causing, by a hypervisor executing on the host computer system, the processor to be placed in a first processor power state corresponding to the first host power state; receiving a second request to place the processor in a second host power state, wherein the second host power state is associated with a second host latency time that is not less than the target latency time; and in response to receiving the second request, causing the virtual machine to exist to the hypervisor.

Examiner 11 includes the subject matter of example 10, wherein the first processor power state is associated with a first entry method that does not comprise a virtual machine exit.

Examiner 12 includes the subject matter of example 10, further comprising: determining that the first processor power state correspond to the first host power state in view of mapping data that map a plurality of processor power states to a plurality of host power states associated with the virtual machine.

Examiner 13 includes the subject matter of example 12, further comprising: mapping, by the hypervisor, the plurality of processor power states to the plurality of host power states; and generating the mapping data.

Examiner 14 includes the subject matter of example 13, wherein mapping the plurality of processor power states comprises: in response to determining that the first processor power state is associated with the first host latency time and that the first processor power state is associated with an entry method that does not comprise a VM exit, mapping the first processor power state to the first host power state.

Examiner 15 includes the subject matter of example 13, further comprising: determining the first host latency time in view of at least one of a time for entering the first processor power state, a time for exiting the first processor power state, a time for entering execution of the virtual machine by the processor, a time for exiting execution of the virtual machine by the processor, a time for the hypervisor to enter an idle state, or a time for the hypervisor to exit the idle state.

Examiner 16 includes the subject matter of example 13, wherein mapping the plurality of processor power states comprises: in response to determining that a second processor power state is associated with a second host latency time that is not less than the target latency time, mapping the second processor power state to the second host power state.

Examiner 17 includes the subject matter of example 13, wherein mapping the plurality of processor power states comprises: in response to determining that a third processor power state of the plurality of processor power states is associated with a third host latency time that is less than the target latency time and that the third processor power state is associated with an entry method comprising a VM exit.

Examiner 18 includes the subject matter of example 13, further comprising: associating, by the hypervisor, the plurality of host power states with the virtual machine.

Examiner 19 includes the subject matter of example 18, wherein associating the plurality of host power states with the virtual machine comprises: generating a data structure defining the plurality of host power states; and associating the data structure with the virtual machine.

Examiner 20 includes the subject matter of example 10, wherein the first processor power state comprises at least one C-state defined by Advanced Configuration and Power Interface (ACPI).

Examples 21 is a method comprising: determining, by a guest operating system of a virtual machine, an idle time for a virtual processor of the virtual machine; comparing, by the guest operating system, the idle time with a target latency time; and in response to determining that the idle time is not less than the target latency time, sending, to a hypervisor, a request to place a processor of a host computer system in a first host power state, wherein the first host power state is associated with a first entry method that performs a virtual machine exit.

Examiner 22 includes the subject matter of example 21, wherein the virtual processor is mapped to the processor of the host computer system.

Examiner 23 includes the subject matter of example 21, wherein the first host power state is associated with a first host latency time that is not less than the target latency time.

Examiner 24 includes the subject matter of example 21, further comprising: in response to determining that the idle time is less than the target latency time, sending, to the hypervisor, a request to place the processor in a second host power state, wherein the second host power state corresponds to a processor power state of the processor of the host computer system.

Examiner 25 includes the subject matter of example 24, wherein the processor power state is associated with a second host latency time that is less than the target latency time.

Examiner 26 includes the subject matter of example 24, wherein the processor power state is associated with an entry method that does not comprise a virtual machine exit.

Examiner 27 includes the subject matter of example 21, wherein determining the idle time for the virtual processor of the virtual machine comprises: determining a state of a process managed by the guest operating system; and determining the idle time for the virtual processor of the virtual machine in view of the state of the process.

Examiner 28 includes the subject matter of example 21, further comprising: providing the idle time for the virtual processor to the hypervisor.

Example 29 is an apparatus comprising: a processing device; and a means for determining a plurality of host latency times for a plurality of processor power states of a processor of a host computer system; a means for comparing, by a hypervisor executed on the host computer system, each of the host latency times to a target latency time associated with a virtual machine running on the host computer system; and a means for mapping the plurality of processor power states to a plurality of host power states in view of the comparison.

Example 30 includes the subject matter of example 29, further comprising the subject matter of any of examples 1-28.

Example 31 is a system comprising: a memory; and a processing device operatively coupled to the memory, the processing device to implement the subject matter of any of examples 1-28.

Example 32 is a non-transitory machine-readable storage medium including instructions that, when accessed by a processing device, cause the processing device to implement the subject matter of any of examples 1-28.

Unless specifically stated otherwise, terms such as "receiving," "invoking," "associating," "providing," "storing," "performing," "detecting," "initiating," "obtaining," "generating," "determining," "updating," "modifying," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 700, 800, and 900 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A power management method for a virtualized computer system, comprising:
   assigning, by a hypervisor, a target latency time to a virtual machine of a plurality of virtual machines running on a host computer system, wherein the target latency time represents a desired response latency time for the virtual machine;
   determining, by the hypervisor, a plurality of host latency times for a plurality of processor power states of a processor of the host computer system;
   comparing, by the hypervisor executed on the host computer system, each host latency time of the plurality of host latency times to the target latency time associated with the virtual machine running on the host computer system;
   for each of the plurality of processor power states, mapping a processor power state of the plurality of processor power states, in view of the comparison, to a host power state of a plurality of host power states implemented by the hypervisor for the virtual machine; and
   providing, by the hypervisor, the plurality of host power states to the virtual machine, wherein the virtual machine performs power management for the virtual machine utilizing the plurality of host power states.

2. The method of claim 1, wherein mapping the plurality of processor power states of the processor to the plurality of host power states in view of the comparison comprises:
   in response to determining that a first host latency time for a first processor power state of the plurality of processor power states is less than the target latency time and that the first processor power state is associated with a first entry method that does not comprise causing the virtual machine to exit to the hypervisor, mapping the first processor power state to a first host power state of the plurality of host power states, wherein the first host power state is associated with the first entry method.

3. The method of claim 2, wherein determining the plurality of host latency times comprises determining the first host latency time in view of at least one of a time for entering the first processor power state, a time for exiting the first processor power state, a time for entering execution of the virtual machine by the processor, a time for exiting execution of the virtual machine by the processor, a time for the hypervisor to enter an idle state, or a time for the hypervisor to exit the idle state.

4. The method of claim 1, wherein mapping the plurality of processor power states of the processor to the plurality of host power states in view of the comparison comprises:
   in response to determining that a second host latency time for a second processor power state of the plurality of processor power states is not less than the target latency time, mapping the second processor power state to a second host power state of the plurality of host power states, wherein the second host power state is associated with a second entry method comprising causing the virtual machine to exit to the hypervisor.

5. The method of claim 1, wherein mapping the plurality of processor power states of the processor to the plurality of host power states in view of the comparison comprises:
   in response to determining that a third host latency time for a third processor power state of the plurality of processor power states is less than the target latency time and that the third processor power state is associated with a third entry method that comprises causing the virtual machine to exit to the hypervisor, disassociating the third processor power state from the virtual machine.

6. The method of claim 5, wherein the plurality of host power states does not comprise a host power state corresponding to the third processor power state.

7. The method of claim 1, wherein providing the plurality of host power states to the virtual machine comprises:
   generating a data structure including information related to the plurality of host power states; and
   associating the data structure with the virtual machine.

8. The method of claim 7, wherein the data structure comprises at least one of a processor object or a Low Power Idle (LPI) structure, and wherein the information related to the plurality of host power states comprises a list of the host power states.

9. The method of claim 8, wherein the data structure comprises at least one of a_CST object or a Low Power Idle (LPI) table defined by Advanced Configuration and Power Interface (ACPI).

10. A system to perform power management for a virtualized computer system, comprising:
    a memory; and
    a processing device operatively coupled to the memory, the processing device to:
    assign a target latency time to a virtual machine of a plurality of virtual machines running on a host computer system, wherein the target latency time represents a desired response latency time for the virtual machine;

receive, from the virtual machine, a first request to place a processor of the host computer system in a first host power state of a plurality of host power states, wherein the first host power state is mapped to a first host latency time of a plurality of host latency times that is less than the target latency time and wherein the first host power state reflects a first power state of a plurality of power states implemented by a hypervisor for the virtual machine;

in response to receiving the first request, cause, by a hypervisor executing on the host computer system, the processor to be placed in a first processor power state of a plurality of processor power states corresponding to the first host power state, wherein the first processor power state is associated with a first entry method that does not comprise a virtual machine exit;

receive a second request to place the processor in a second host power state of the plurality of host power states, wherein the second host power state is mapped to a second host latency time of the plurality of host latency times that is not less than the target latency time and wherein the second host power state reflects a second power state of the plurality of power states implemented by the hypervisor for the virtual machine; and in response to receiving the second request, cause, by a hypervisor executing on the host computer system, the processor to be placed to a second processor power state associated with a second entry method, wherein the second entry method includes causing the virtual machine to exit to the hypervisor.

11. The system of claim 10, wherein the processing device is further to:

determine that the first processor power state correspond to the first host power state in view of mapping data that map a plurality of processor power states to a plurality of host power states associated with the virtual machine, wherein the plurality of host power states reflect one or more power states implemented by the hypervisor for the virtual machine.

12. The system of claim 11, wherein the processing device is further to:

map the plurality of processor power states to the plurality of host power states; and generate the mapping data.

13. The system of claim 12, wherein, to map the plurality of processor power states, the processing device is further to:

in response to determining that the first processor power state is associated with the first host latency time and that the first processor power state is associated with an entry method that does not comprise a VM exit, map the first processor power state to the first host power state.

14. The system of claim 12, wherein the processing device is further to:

determine the first host latency time in view of at least one of a time for entering the first processor power state, a time for exiting the first processor power state, a time for entering execution of the virtual machine by the processor, a time for exiting execution of the virtual machine by the processor, a time for the hypervisor to enter an idle state, or a time for the hypervisor to exit the idle state.

15. The system of claim 12, wherein, to map the plurality of processor power states, the processing device is further to:

in response to determining that a second processor power state is associated with a second host latency time that is not less than the target latency time, map the second processor power state to the second host power state.

16. The system of claim 12, wherein, to map the plurality of processor power states, the processing device is further to:

in response to determining that a third processor power state of the plurality of processor power states is associated with a third host latency time that is less than the target latency time and that the third processor power state is associated with an entry method comprising a VM exit, disassociate the third processor power state from the virtual machine.

17. The system of claim 10, wherein the first processor power state comprises at least one C-state defined by Advanced Configuration and Power Interface (ACPI).

18. A non-transitory machine-readable storage medium including instructions for performing power management by a virtual machine, that, when accessed by a processing device, cause the processing device to:

determine an idle time for a virtual processor of the virtual machine at least based on historical idle times;

compare the idle time with a target latency time; and in response to determining that the idle time is not less than the target latency time, send, to a hypervisor, a request to place a processor of a host computer system in a first host power state of a plurality of host power states, wherein the first host power state is associated with a first entry method that performs a virtual machine exit and wherein the first host power state reflects a power state implemented by the hypervisor for the virtual machine; and in response to determining that the idle time is less than the target latency time, send, to the hypervisor, a request to place the processor in a second host power state of the plurality of host power states, wherein the second host power state corresponds to a processor power state of the processor of the host computer system, wherein the processor power state is associated with a second host latency time that is less than the target latency time, and wherein the processor power state is associated with an entry method that does not comprise a virtual machine exit.

* * * * *